(No Model.)
T. J. CLOSE.
JUNCTION BOX FOR ELECTRIC CONDUCTORS.
No. 598,498. Patented Feb. 8, 1898.
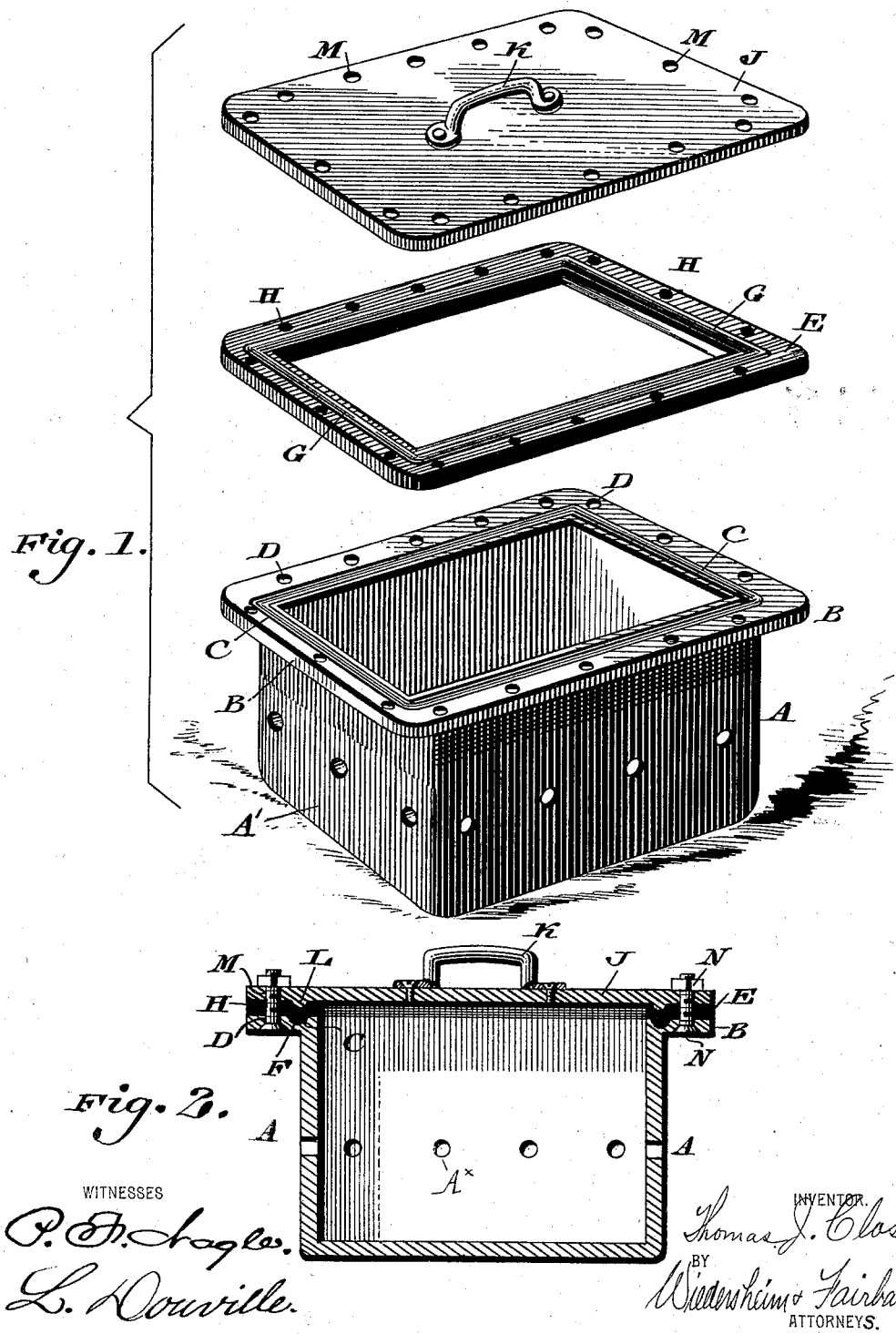

UNITED STATES PATENT OFFICE.

THOMAS J. CLOSE, OF PHILADELPHIA, PENNSYLVANIA.

JUNCTION-BOX FOR ELECTRIC CONDUCTORS.

SPECIFICATION forming part of Letters Patent No. 598,498, dated February 8, 1898.

Application filed May 26, 1897. Serial No. 638,209. (No model.)

*To all whom it may concern:*

Be it known that I, THOMAS J. CLOSE, a citizen of the United States, residing in the city and county of Philadelphia, State of Pennsylvania, have invented a new and useful Improvement in Boxes for Electric Conductors, which improvement is fully set forth in the following specification and accompanying drawings.

My invention consists of an improvement in junction-boxes whereby the same may be easily and effectively closed and leakage is prevented and the necessity of planing the contacting surfaces is avoided and a rough casting may be employed.

Figure 1 represents a perspective view of a junction-box embodying my invention, showing the parts separated and the gasket as it appears when in position. Fig. 2 represents a vertical sectional view showing the parts in assembled position.

Similar letters of reference indicate corresponding parts in the figures.

Referring to the drawings, A designates a junction-box having the body portion A', on which is the flange B, said body portion being provided with a groove C in its upper face, said groove extending entirely around the box and said flange having openings D therein.

E designates a gasket of rubber or other suitable compressible or resilient material, which is preferably plain and provided with openings H; but, if desired, the gasket may be provided with a groove G and a ridge on the opposite face.

J designates the cover of said box A, the same having a handle K and being provided with a ridge or projection L, which is adapted to enter the groove G in the gasket E, and said lid being provided with the openings M.

It will of course be understood that I do not desire to be limited to the groove on the face of the body A' nor to the ridge L on the cover, as the same may be reversed, the object of my invention being accomplished by forming a portion of the gasket into a groove by the action of a ridge when the parts are assembled.

N designates bolts or screws which are adapted to pass through the openings D, H, and M in the flange B, gasket E, and lid M, respectively, and is provided with the nut N, whereby the parts are securely locked.

When the gasket E is placed on the flange B and the cover J is secured thereto, the pressure causes the ridge L to force a portion F of the gasket into the groove C, as will be seen in Fig. 2, making a tight joint, and the gasket will fill any ordinary irregularities that may occur in the manufacture of the parts, whereby leakage is prevented. The parts may be easily assembled and the cost of planing or otherwise smoothing the contacting faces is avoided.

In practice I desire, as above stated, to form the gasket without the ridge and groove; but, if necessary, I may employ the same.

In the sides of body A' are the openings $A^\times$ for the passage of the conductors therein.

Having thus described my invention, what I claim as new, and desire to secure by Letters Patent, is—

1. A junction-box for electric conductors, consisting of a body having openings in the sides thereof and provided with a flange at its upper edge having a groove therein and a series of openings outside of said groove, a lid with a series of openings registering with the flange-openings and bolts for said openings with locking-nuts.

2. A junction-box for electric conductors consisting of a body portion having openings in its sides and provided with a flanged rim having openings therein, a lid with a handle and provided with openings registering with said flange-openings and a gasket between said flange and lid, said lid and flange having an interlocking ridge and groove joint.

THOMAS J. CLOSE.

Witnesses:
WM. C. WIEDERSHEIM,
JOHN A. WIEDERSHEIM.